US008967669B2

(12) United States Patent
Kane et al.

(10) Patent No.: US 8,967,669 B2
(45) Date of Patent: Mar. 3, 2015

(54) LOW FLOOR VEHICLES FOR TRANSPORTING PASSENGERS

(71) Applicant: Champion Bus, Inc., Imlay City, MI (US)

(72) Inventors: Kenneth Kane, Jackson Center, OH (US); Shawn Yopp, Jackson Center, OH (US); John Smyczak, Jackson Center, OH (US)

(73) Assignee: Champion Bus, Inc., Imlay, MI (US)

( * ) Notice: Subject to any disclaimer, the term of this patent is extended or adjusted under 35 U.S.C. 154(b) by 73 days.

(21) Appl. No.: 13/953,983

(22) Filed: Jul. 30, 2013

(65) Prior Publication Data

US 2014/0346763 A1     Nov. 27, 2014

Related U.S. Application Data

(60) Provisional application No. 61/827,143, filed on May 24, 2013.

(51) Int. Cl.
*B62D 21/02* (2006.01)
*A61G 3/06* (2006.01)

(52) U.S. Cl.
CPC ............... *B62D 21/02* (2013.01); *A61G 3/061* (2013.01)
USPC ........... 280/781; 180/311; 280/795; 280/797; 414/545

(58) Field of Classification Search
CPC ................................ B62D 21/00; B62D 21/02
USPC ................ 280/781, 788, 790, 795, 797, 166, 280/6.152; 180/311; 296/25, 178; 414/545
See application file for complete search history.

(56) References Cited

U.S. PATENT DOCUMENTS

| 3,628,209 | A | | 12/1971 | Parent |
| 4,131,209 | A | | 12/1978 | Manning |
| 4,559,659 | A | | 12/1985 | Hunter, Jr. |
| 4,863,189 | A | | 9/1989 | Lindsay |
| 5,033,567 | A | * | 7/1991 | Washburn et al. ......... 180/89.12 |
| 5,066,067 | A | | 11/1991 | Ferdows |
| 5,676,515 | A | | 10/1997 | Haustein |
| 6,186,733 | B1 | | 2/2001 | Lewis et al. |

(Continued)

FOREIGN PATENT DOCUMENTS

| EP | 2495115 A1 * | 9/2012 |
| JP | 11-348834 A | 12/1999 |
| JP | 2000-219147 | 8/2000 |
| JP | 2001-180534 | 7/2001 |
| JP | 2001-180534 A | 7/2001 |

(Continued)

OTHER PUBLICATIONS

International Search Report and Written Opinion dated Sep. 24, 2014 for related PCT Patent Application No. PCT/US2014/039604; 9 pages.

(Continued)

*Primary Examiner* — James English
(74) *Attorney, Agent, or Firm* — Hovey Williams LLP

(57) ABSTRACT

In one embodiment, a vehicle for transporting passengers can include a chassis, a support member, and a labyrinthine girder. The support member can be rigidly engaged to and project from the chassis. The labyrinthine girder can include a coupling platform that is coupled to the support member. The labyrinthine girder can form a partial enclosure that surrounds a portion of the frame rail. An offset distance can be disposed between the labyrinthine girder and the frame rail.

20 Claims, 13 Drawing Sheets

(56) References Cited

U.S. PATENT DOCUMENTS

| | | | |
|---|---|---|---|
| 7,044,504 B2* | 5/2006 | Studebaker et al. | 280/783 |
| 7,802,801 B2 | 9/2010 | Bartel et al. | |
| 7,908,976 B2 | 3/2011 | Pujol | |
| 8,371,589 B2 | 2/2013 | Bartel et al. | |
| 8,888,135 B1* | 11/2014 | Reitnouer | 280/788 |
| 2004/0148778 A1* | 8/2004 | Fleming | 29/897.2 |
| 2009/0195015 A1 | 8/2009 | Kerr et al. | |
| 2012/0161469 A1 | 6/2012 | Kerr et al. | |
| 2014/0049033 A1* | 2/2014 | Yee et al. | 280/797 |

FOREIGN PATENT DOCUMENTS

| | | |
|---|---|---|
| JP | 2003-212146 | 7/2003 |
| JP | 2003-293537 A | 10/2003 |
| KR | 10-0290036 | 5/2001 |
| WO | WO 02092414 A1 * | 11/2002 |

OTHER PUBLICATIONS

Search Report and Written Opinion dated Sep. 24, 2014 for related PCT Patent Application No. PCT/US2014/039603; 10 pages.

* cited by examiner

LOW FLOOR VEHICLES FOR TRANSPORTING PASSENGERS

CROSS REFERENCE TO RELATED APPLICATIONS

This application claims the benefit of U.S. Provisional Application No. 61/827,143, entitled LOW FLOOR TRANSIT VEHICLES, filed May 24, 2013. This application is related to copending U.S. application Ser. No. 13/954,152, entitled "RETRACTABLE STEPS FOR LOW FLOOR VEHICLES FOR TRANSPORTING PASSENGERS," filed Jul. 30, 2013.

BACKGROUND

The present specification generally relates to vehicles for transporting passengers and, more specifically, to vehicles for providing access to handicapped or ambulatory passengers.

Vehicles such as, for example, buses, ambulances, and the like, can be utilized to transport a relatively high volume of passengers compared to consumer vehicles such as cars. Vehicles can be produced and sold by an original equipment manufacturer (OEM). Alternatively, an OEM can manufacture and sell a chassis that includes a cab, a frame and other rolling components (e.g., drive train, axle, wheels, and the like). The OEM chassis can be sold to other manufacturers that modify the OEM chassis or add components to the OEM chassis to produce a vehicle in various states of completeness. For example, the OEM chassis can be modified by an intermediary and resold as a chassis cab that includes specialized equipment such as, for example, frame modifications and suspension modifications. An example of a chassis cab is the Air-Chassis™ by Dallas Smith Corp. of Greencastle, Ind., USA.

Accordingly, the OEM chassis or chassis cab can include suspension components that lower or "kneel" the chassis to a curb height to accommodate loading of passengers, frames that have been modified to accept a ramp for loading handicapped or ambulatory passengers, or both. Despite kneeling and ramp accessible chassis equipment, handicapped passengers can have difficulty with ingress and egress from low floor vehicles.

Accordingly, a need exists for alternative vehicles for providing access to handicapped or ambulatory passengers.

SUMMARY

In one embodiment, a vehicle for transporting passengers can include a chassis, a support member, and a labyrinthine girder. The chassis can include a front axle, a rear axle, and a frame. The rear axle can be offset from the front axle by an axle distance. The frame can support the front axle and the rear axle. The frame can include a frame rail having a recessed section and a standard section such that the frame rail spans at least a portion of the axle distance. The recessed section can be lowered compared to the standard section. The support member can be rigidly engaged to the frame rail. The support member can project from the frame rail. The labyrinthine girder can include a coupling platform that is coupled to the support member. The labyrinthine girder can form a partial enclosure that surrounds a portion of the frame rail. An offset distance can be disposed between the labyrinthine girder and the frame rail.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
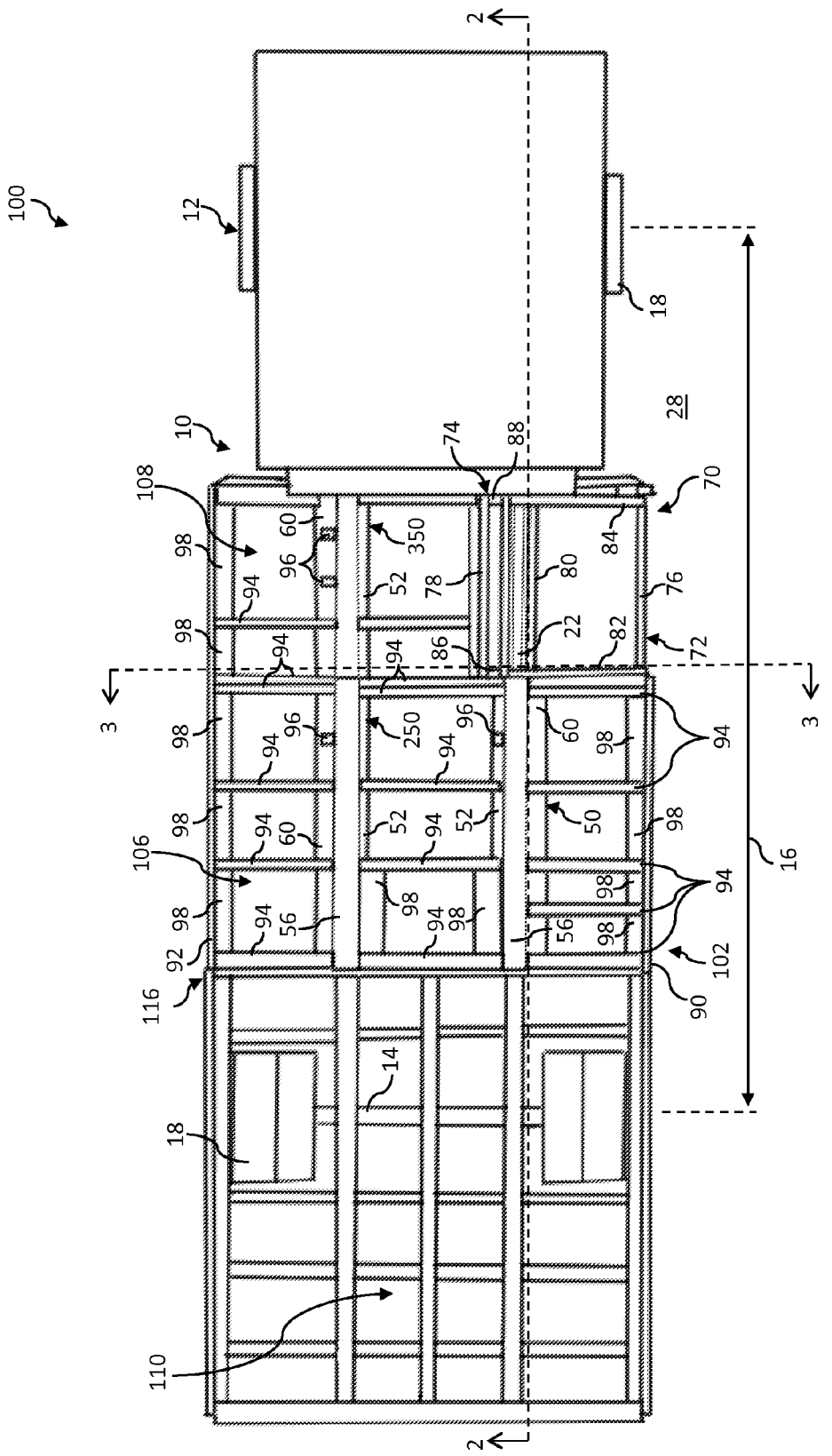
FIG. 1 depicts a vehicle according to one or more embodiments shown and described herein.

FIG. 1 generally depicts one embodiment of a vehicle for transporting passengers having a low floor for providing access to handicapped passengers. The vehicle generally comprises a chassis that provides the drive components and a subfloor structure for supporting specialized components of the vehicle. Various embodiments of the vehicle and the operation of the vehicle will be described in more detail herein.

Referring to FIG. 1, a vehicle 100 for transporting passengers is schematically depicted. The vehicle 100 has a chassis 10 that can be outfitted with subfloor structures 102. The subfloor structures 102 can support or be the base structure for specialized bodies such as, for example, motor homes, fire engines, ambulances, box trucks, buses and the like. The chassis 10 comprises a front axle 12 and a rear axle 14. The rear axle 14 can be offset from the front axle 12 by an axle distance 16. Each of the front axle 12 and the rear axle 14 are configured to orient the wheels 18 and support the weight of the chassis 10. The front axle 12, the rear axle 14 or both can be configured to transmit driving torque to the wheels 18. It is noted that, the chassis 10 can include additional components for road operation of a vehicle such as, for example, engine, transmission, driveshaft, differential, suspension, and the like.

Figure 2:
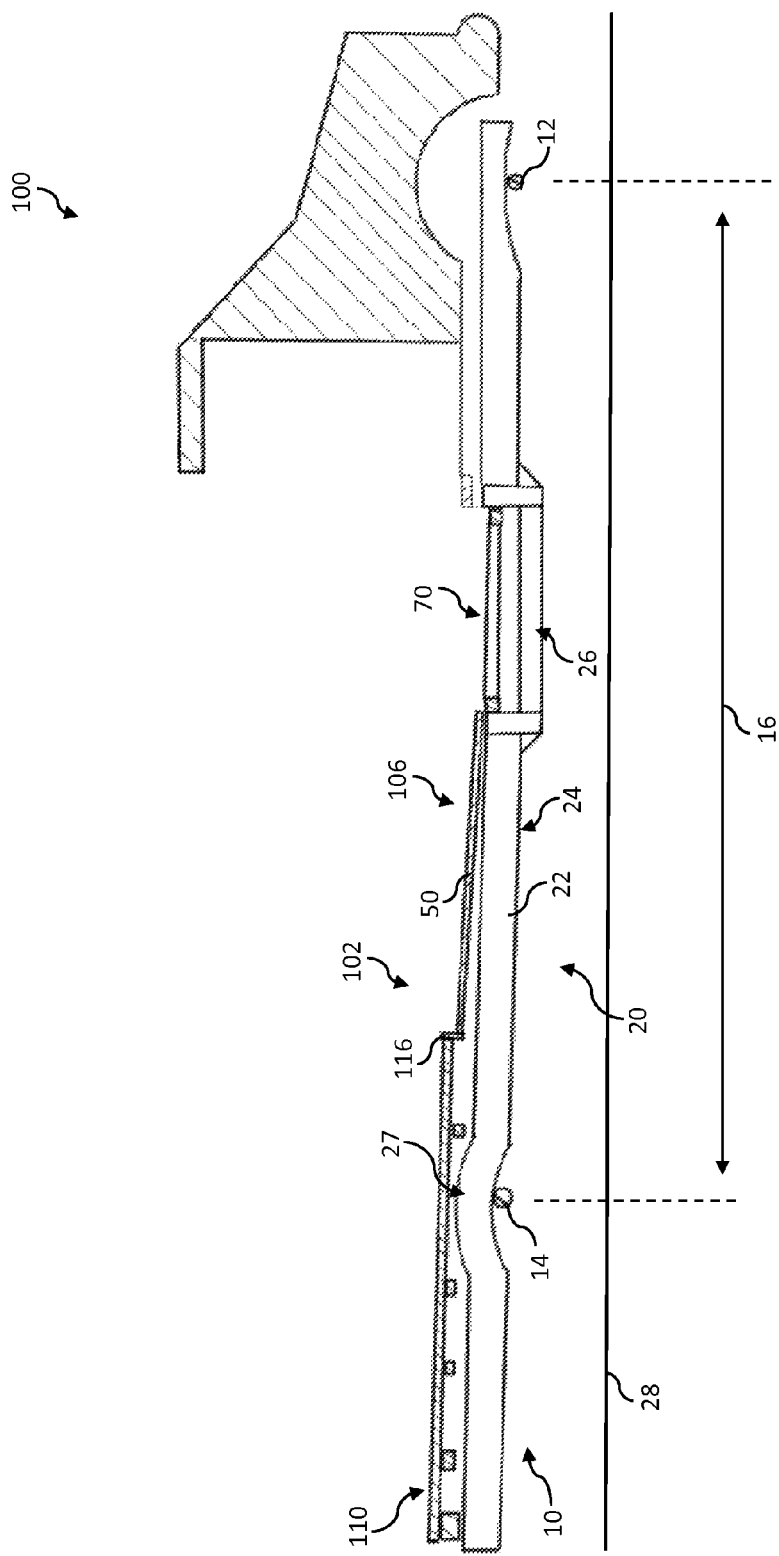
FIG. 2 depicts a cross sectional view of the vehicle of FIG. 1 according to one or more embodiments shown and described herein.

Referring now to FIG. 2, the chassis 10 comprises a frame 20 that supports the front axle 12 and the rear axle 14. The frame 20 is configured to provide the framework for the assembly of components to the chassis 10. According to the embodiments described herein, the frame 20 comprises one or more frame rails 22 that span the axle distance 16 between the front axle 12 and the rear axle 14. The frame rail 22 can be configured such that it runs along the chassis 10 in a direction that is substantially perpendicular to the front axle 12. It is noted that, while the frame rail 22 is depicted as a single integral component, the frame rail 22 can be constructed from a plurality of members coupled to one another to traverse the any portion of the axle distance 16.

The frame rail 22 comprises one or more standard sections 24 that establish a baseline height for the frame rail 22. The frame rail 22 can further comprise a recessed section 26 that is lowered compared to the standard section 24. For example, the recessed section 26 can be formed by modifying an existing frame by removing a portion of the frame and installing a new section at a lower height. Alternatively, a manufactured chassis can be manufactured with a section at a lower height to form the recessed section 26. As used herein, the term "lower" and other similar directional terms generally indicate that an object is situated nearer to the ground 28. Likewise, the term "downward" and other similar directional terms are used to indicate a direction towards the ground 28. Additionally, as used herein, the term "higher" and other similar directional terms generally indicate that an object is situated further from the ground 28. Likewise, the term "upward" and other similar directional terms are used to indicate a direction away from the ground 28. It is furthermore noted that the ground 28 can be any substantially flat surface capable of supporting the chassis 10.

Figure 3:
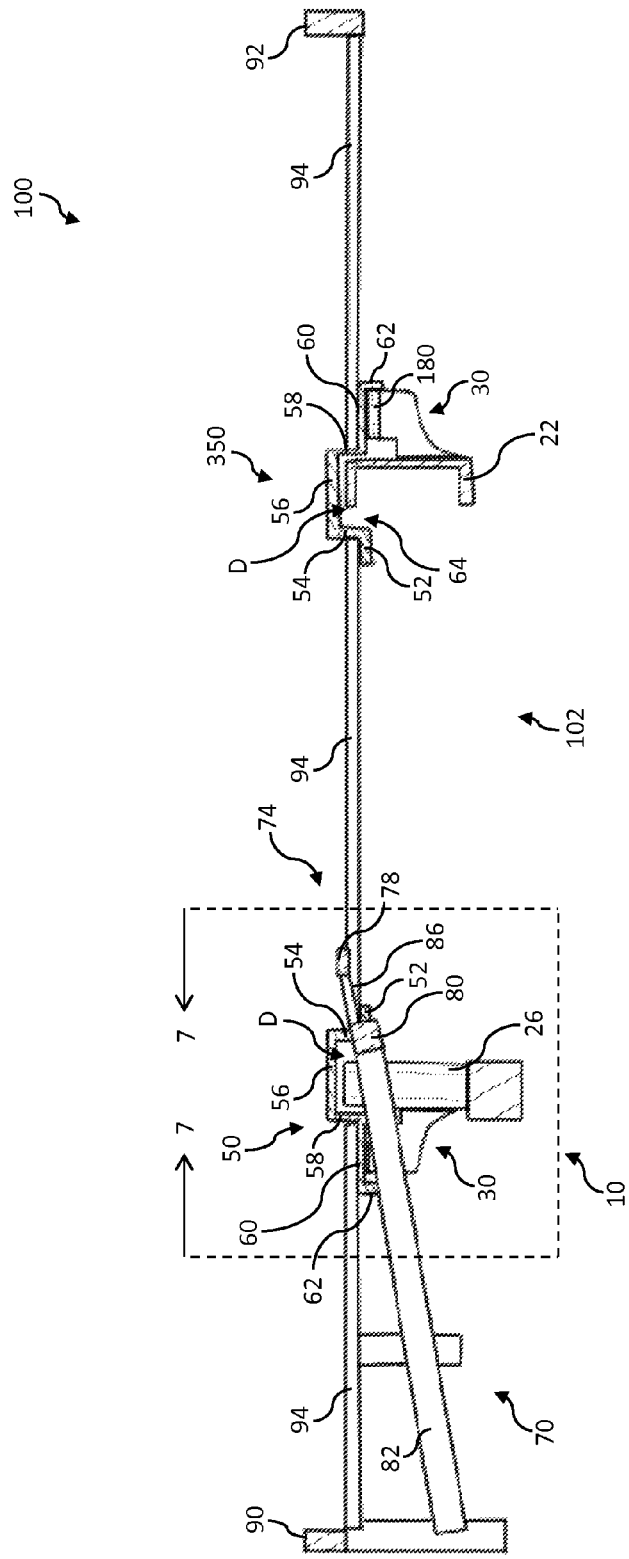
FIG. 3 depicts a cross sectional view of the vehicle of FIG. 1 according to one or more embodiments shown and described herein.

Referring now to FIG. 3, the embodiments described herein can include a support member 30 for bearing loads and anchoring objects to the chassis 10. The support member 30 can be formed from any material suitable to bear loads of objects that are anchored to the chassis 10. Suitable materials include metals such as, for example, steel or aluminum. It is noted that the strength of the material and the size and overall number of support members 30 that may be required are inversely correlated. That is, for stronger materials, smaller and fewer support members 30 can be utilized to carry an equivalent load. While, for weaker materials, larger and more support members 30 can be utilized to carry the equivalent load.

Figure 4C:
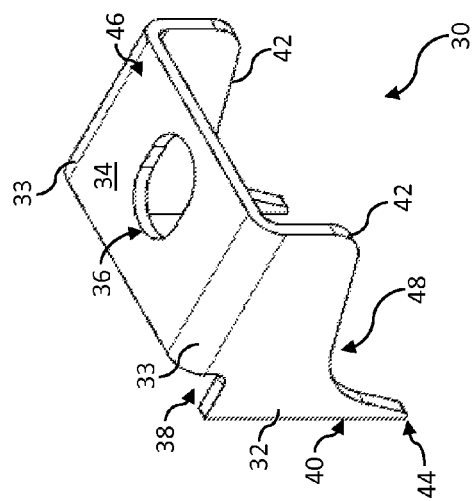
FIGS. 4A, 4B, and 4C depict a support member according to one or more embodiments shown and described herein.
Figure 4A:
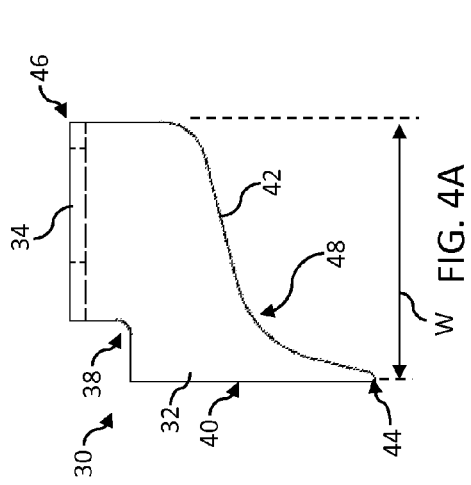
Figure 4B:
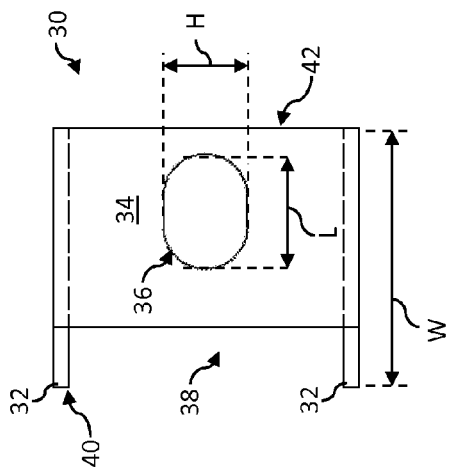

Referring now to FIGS. 4A, 4B and 4C, the support member 30 can comprise frame coupling members 32 and a girder support member 34. The frame coupling members 32 and the girder support member 34 can be formed integrally from a single plate that is bent into the desired form. Alternatively, the support member 30 can be machined out of a block of material. In some embodiments, a rounded edge 33 can be formed between each of the frame coupling members 32 and the girder support member 34.

The frame coupling members 32 are configured for rigid attachment to an object. Moreover, when the frame coupling members 32 are attached to the object, the support member 30 are configured such that the girder support member 34 is offset from the object. For example, one or more of the frame coupling members 32 can comprise a notch 38. The notch 38 can be formed such that girder support member 34 located away from and above the chassis end 40 of the frame coupling member 32. In some embodiments, the notch 38 can comprise a substantially rectangular shape, or any other shape suitable to provide the girder support member 34 as a cantilevered support with respect to an object rigidly engaged to the frame coupling member 32. It is noted that the phrase "rigidly engaged," as used herein, means that objects are united, directly or indirectly, in a manner that mitigates relative motion between the objects. Accordingly, objects can be rigidly engaged via welds, bolted joints, and the like.

The girder support member 34 can comprise a mounting orifice 36 that is formed through the girder support member 34 to accept a fastener, such as, for example, a bolt, rod, pin, screw, and the like. The mounting orifice 36 has a length L and a height H. An aspect ratio for the mounting orifice 36 can be defined as the length L divided by the height H (H/L). In some embodiments, the mounting orifice 36 can have a substantially oval shape or substantially rectangular shape. For example, the mounting orifice 36 can be formed such that the aspect ratio is greater than about 1, in another embodiment, the aspect ratio can be from about 1.1 to about 1.8.

Referring still to FIG. 4A, the free end 42 of the frame coupling member 32 can include an arched portion 48 formed downwards from and underneath the girder support member 34. Specifically, the arched portion 48 can have a width W—measured from the chassis end 40 of the frame coupling member 32 to the free end 42 of the frame coupling member—that gradually increases as the arched portion 48 moves upwards from the lower end 44 of the support member 30 towards the upper end 46 of the support member 30. In some embodiments, the arched portion 48 can form a substantially cubed root shape, i.e., the rate of increase of the width W can increase as the arched portion 48 moves upwards from the lower end 44 of the support member 30 towards the upper end 46 of the support member 30.

Referring again to FIG. 1, the vehicle 100 can further comprise a labyrinthine girder 50 for supporting specialized body components over the chassis 10. According to the embodiments described herein, the labyrinthine girder 50 is configured to provide support for a low floor, i.e., the labyrinthine girder 50 can be utilized to provide support for a floor in the vehicle 100 that is relatively close to the ground 28 when the vehicle 100 is in normal operation. The labyrinthine girder 50 can be formed from any material suitable to bear load the load of the vehicle 100 without deformation. Suitable materials include metals such as, for example, steel or aluminum.

Figure 5B:
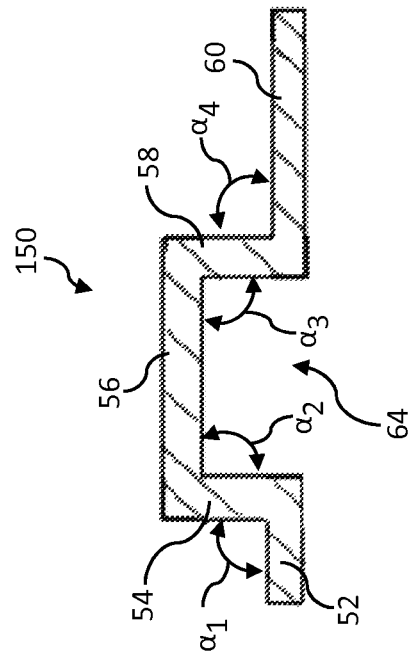
FIGS. 5A and 5B depict a cross sectional view of labyrinthine girders according to one or more embodiments shown and described herein.
Figure 5A:
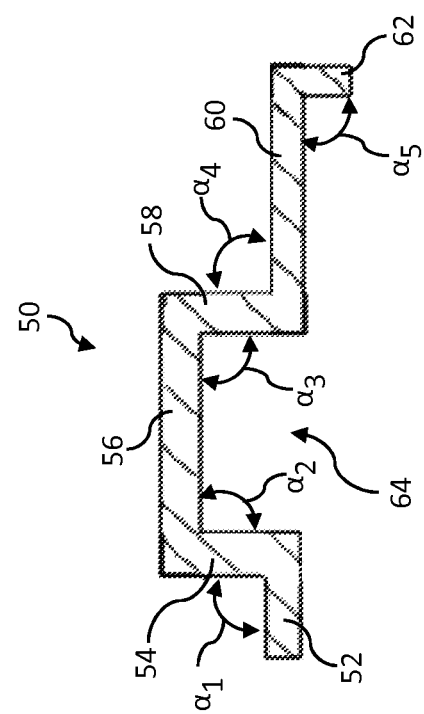

Referring to FIG. 5A, the labyrinthine girder 50 can comprise a support platform 52 for supporting structural objects. The support platform 52 can extend to a first frame bounding riser 54. The support platform 52 can be rigidly engaged or integral with the first frame bounding riser 54 such that the first frame bounding riser 54 supports the weight of the support platform 52 and any load applied to the support platform 52. The interface between the support platform 52 and the first frame bounding riser 54 can form a first girder angle $\alpha_1$.

The labyrinthine girder 50 can further comprise a frame bounding platform 56 and a second frame bounding riser 58. The first frame bounding riser 54, the frame bounding platform 56 and the second frame bounding riser 58 can cooperate to form a partial enclosure 64. Specifically, the first frame bounding riser 54 and the second frame bounding riser 58 can be oriented to extend substantially vertically, i.e., upwards and downwards. The first frame bounding riser 54 and the second frame bounding riser 58 can be spaced from one another. The frame bounding platform 56 can span the space between the first frame bounding riser 54 and the second frame bounding riser 58 and can be rigidly engaged or integral with each of the first frame bounding riser 54 and the second frame bounding riser 58 to demarcate the partial enclosure 64. The interface between the first frame bounding riser 54 and the frame bounding platform 56 can form a second girder angle $\alpha_2$. The frame bounding platform 56 and the second frame bounding riser 58 can form a third girder angle $\alpha_3$.

According to the embodiments described herein, the labyrinthine girder 50 can comprise a coupling platform 60 for mounting the labyrinthine girder 50 to an object. The coupling platform 60 can be rigidly engaged or integral with the second frame bounding riser 58 such that when the coupling platform 60 is coupled to an object, the coupling platform 60 supports the weight of the labyrinthine girder 50 and any load applied to the labyrinthine girder 50. The interface between the coupling platform 60 and the second frame bounding riser 58 can form a fourth girder angle $\alpha_4$.

The labyrinthine girder 50 can also comprise a support bounding riser 62 that forms a flange for containing an object mounted to the labyrinthine girder 50. The support bounding riser 62 can be rigidly engaged or integral with the coupling platform 60. The interface between the coupling platform 60 and support bounding riser 62 can form a fifth girder angle $\alpha_5$. It is noted that, while the fifth girder angle $\alpha_5$ is depicted in FIG. 5A as being about 90°, the fifth girder angle $\alpha_5$ can be any angle that is sufficient to orient the support bounding riser 62 to the coupling platform 60 such that the support bounding riser 62 operates as a secondary retention feature for an object coupled directly or indirectly to the labyrinthine girder 50. For example, in one embodiment the fifth girder angle $\alpha_5$ can be from about 60° to about 120°.

Referring collectively to FIGS. 5A and 5B, the labyrinthine girder 50 (FIG. 5A) and the labyrinthine girder 150 (FIG. 5B), which is similar in structure to the labyrinthine girder 50 with the omission of the support bounding riser 62, can have a substantially top hat shape. Specifically, the support platform 52, the first frame bounding riser 54, the frame bounding platform 56, the second frame bounding riser 58, and the coupling platform 60 can cooperate to form a cross sectional shape that follows a substantially top hat shape. It is noted that, while the first girder angle $\alpha_1$, the second girder angle $\alpha_2$, the third girder angle $\alpha_3$, and the fourth girder angle $\alpha_4$ are depicted as having substantially the same angle, each of the first girder angle $\alpha_1$, the second girder angle $\alpha_2$, the third girder angle $\alpha_3$, and the fourth girder angle $\alpha_4$ can have their own distinct angle without deviating from the top hat shape. It is furthermore noted that, while the first girder angle $\alpha_1$, the second girder angle $\alpha_2$, the third girder angle $\alpha_3$, and the fourth girder angle $\alpha_4$ are depicted as being about 90°, according to the embodiments described herein, the first girder angle $\alpha_1$, the second girder angle $\alpha_2$, the third girder angle $\alpha_3$, and the fourth girder angle $\alpha_4$ can be any angle from about 45° to about 135°.

Moreover, the top hat shape can be formed from a variety of configurations that provide the support platform 52, the frame bounding platform 56, and the coupling platform 60 for supporting loads from an object coupled to the coupling platform 60, while contemporaneously defining the partial enclosure 64. Accordingly, additional facets and features can be added to the embodiments described herein without deviating from the substantially top hat cross sectional shape. It is furthermore contemplated that facets and features can be removed from the embodiments described herein without deviating from the top hat shape, provided that shape includes the aforementioned load support characteristics and partial enclosure 64.

Referring again to FIG. 1, the vehicle 100 can comprise a subfloor structure 102 that mounts to the chassis 10 and provides support for flooring surfaces to be mounted upwards of the subfloor structure 102. According to the embodiments described herein, the subfloor structure 102 can define a plurality of sections. The subfloor structure 102 can comprise an access ramp frame 70 for providing ingress and egress from the vehicle 100, a passenger section 106 for providing seating for passengers during transit, a landing section 108 for providing a substantially level surface for securing passengers seated within wheel chairs, and an elevated passenger section 110 for providing additional seating for passengers during transit.

Figure 6:
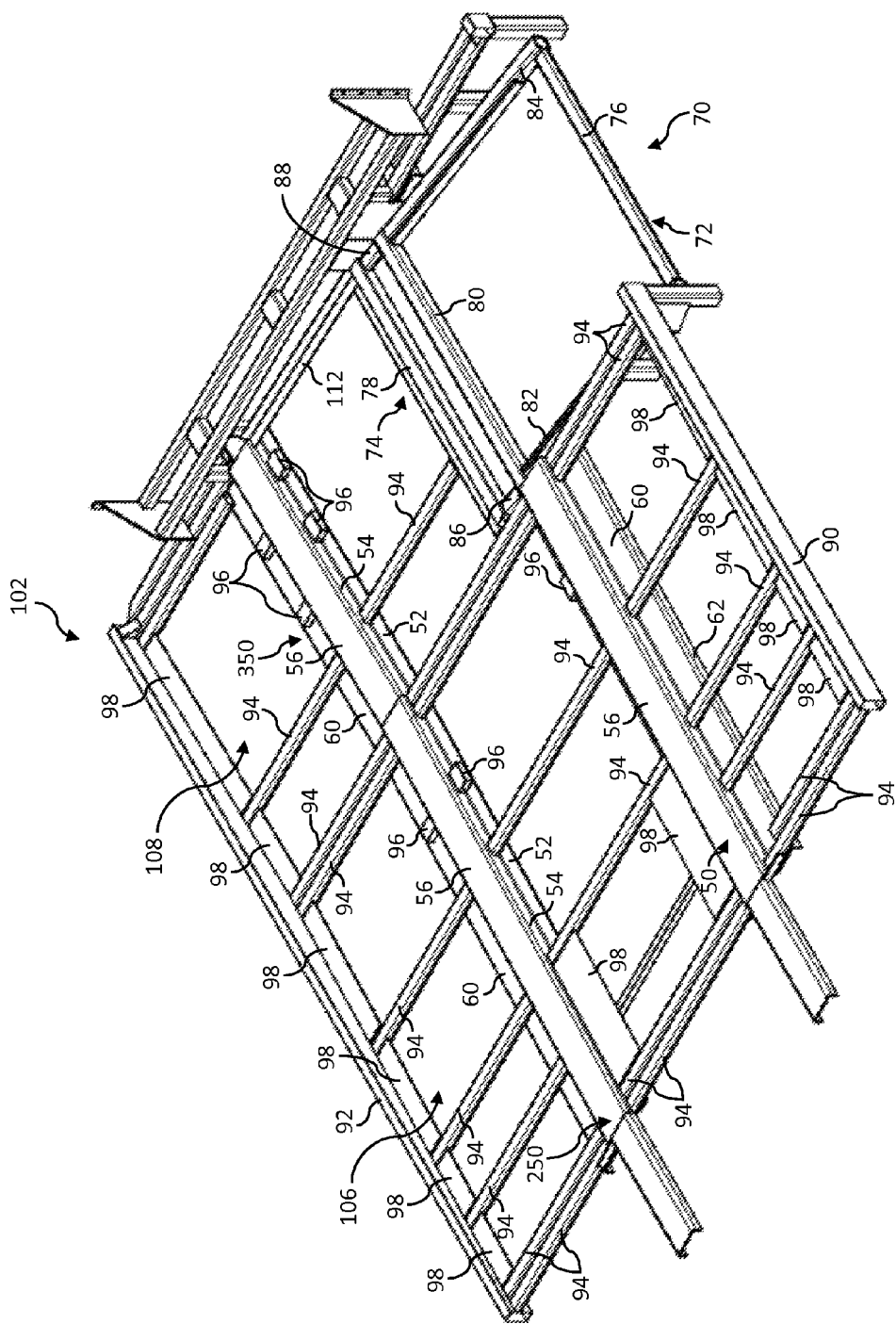
FIG. 6 depicts a subfloor structure according to one or more embodiments shown and described herein.

Referring collectively to FIGS. 1 and 6, embodiments of the present disclosure can comprise an access ramp frame 70 for providing structural support for an entrance ramp. Accordingly, the access ramp frame 70 generally includes structural members that are rigidly engaged or integral with one another to form a structure suitable for handling the loads generated during the loading and unloading of passengers. The access ramp frame 70 can be formed from metals such as, for example, steel or aluminum.

The access ramp frame 70 has a lowered end 72 that is located near an outer boundary of the vehicle and a raised end 74 that is higher in elevation than the lowered end 72. Generally, the access ramp frame 70 forms the base for the installation for an inclined surface that has a gradually increasing slope from the lowered end 72 to the raised end 74 of the access ramp frame 70. The access ramp frame 70 can comprise a lower cross member 76 at the lowered end 72 of the access ramp frame 70 and extending across the access ramp frame 70, and an upper cross member 78 at the raised end of the access ramp frame 70 and extending across the access ramp frame 70. The access ramp frame 70 can comprise an intermediate cross member 80 located between the lower cross member 76 and the upper cross member 78, and extending across the access ramp frame 70.

Additionally, the access ramp frame 70 can comprise a first ramp support member 82 and a second ramp support member 84 located across the access ramp frame 70 from one another. Each of the first ramp support member 82 and the second ramp support member 84 can extend from the lower cross member 76 to the intermediate cross member 80. Each of the first ramp support member 82 and the second ramp support member 84 can form a slope as each gradually increases in elevation between the lower cross member 76 and the intermediate cross member 80.

The access ramp frame 70 may further comprise a first intermediate ramp support member 86 and a second intermediate ramp support member 88 located across the access ramp frame 70 from one another. Each of the first intermediate ramp support member 86 and the second intermediate ramp support member 88 can extend from the intermediate cross member 80 to the upper cross member 78. Each of the first intermediate ramp support member 86 and the second intermediate ramp support member 88 can form a slope as each gradually increases in elevation between the intermediate cross member 80 and the upper cross member 78. In some embodiments, the first intermediate ramp support member 86 and the second intermediate ramp support member 88 can each be shorter in length, i.e., the distance between the intermediate cross member 80 and the upper cross member 78, than of the length each of the first ramp support member 82 and the second ramp support member 84, i.e., the distance between the lower cross member 76 and the intermediate cross member 80. It is noted that, according to the embodiments described herein, components can be added to or deleted from the access ramp frame 70.

Referring collectively to FIGS. 1 and 6, the passenger section 106 can comprise a labyrinthine girder 50 and a second labyrinthine girder 250. Each of the labyrinthine girder 50 and the second labyrinthine girder 250 can be of substantially similar construction, as is described hereinabove in greater detail. The labyrinthine girder 50 and the second labyrinthine girder 250 can be aligned with on another such that the labyrinthine girder 50 and the second labyrinthine girder 250 are substantially parallel. Additionally, it is noted that, while the coupling platform 60 of the labyrinthine girder 50 and the second labyrinthine girder 250 are depicted as facing one another, i.e., towards the center of the passenger section 106, the coupling platform 60 of the labyrinthine girder 50 can face the support platform 52 of the second labyrinthine girder 250, and vice versa.

The subfloor structure 102 can further comprise a loading side support 90 and a landing side support 92 that are located on opposing sides of the subfloor structure 102 and run along the length of the subfloor structure 102, i.e., substantially along the axle distance 16. The subfloor structure 102 can further comprise joists 94 for providing mounting points and structural support in a direction substantially perpendicular to the axle distance 16 for the flooring surfaces. Spacers 96 and structural plates 98 can be further utilized to provide additional mounting points for flooring surfaces and accessories such as, for example, seats, hand rails and the like. Each of the loading side support 90, the landing side support 92, joists 94, spacers 96 and structural plates 98 can be formed from the materials described herein above with respect to the labyrinthine girder 50.

Referring collectively to FIGS. 1 and 3, one or more joists 94 can extend from the loading side support 90 to the labyrinthine girder 50. For example, a first end of each of the joists 94 can be rigidly engaged with the loading side support 90 and a second end of each of the joists 94 can be rigidly engaged with the coupling platform 60 of the labyrinthine girder 50. Additionally, one or more structural plates 98 can be rigidly engaged with the loading side support 90.

One or more joists 94 can extend from the labyrinthine girder 50 to the third labyrinthine girder 350. Specifically, a first end of each of the joists 94 can be rigidly engaged with the support platform 52 of the labyrinthine girder 50 and a second end of each of the joists 94 can be rigidly engaged with the support platform 52 of the third labyrinthine girder 350. Spacers 96 and structural plates 98 can be rigidly engaged with the support platform 52 of each of the labyrinthine girder 50 and the third labyrinthine girder 350.

The passenger section 106 of the subfloor structure 102 can further comprise one or more joists 94 that extend from the second labyrinthine girder 250 to the landing side support 92. Specifically, a first end of each of the joists 94 can be rigidly engaged with the coupling platform 60 of the second labyrinthine girder 250 and a second end of each of the joists 94 can be rigidly engaged with the landing side support 92. Additionally, one or more structural plates 98 can be rigidly engaged with the landing side support 92. A top surface of each of the joists 94, spacers 96 and structural plates 98 of the passenger section 106 can be substantially flush to provide mounting points for flooring sheets.

Referring collectively to FIGS. 1 and 3, the passenger section 106 of the subfloor structure 102 can be rigidly engaged with the access ramp frame 70. The rigid engagement can be formed adjacent to the recessed section 26 of the chassis 10. Specifically, the raised end 74 of the access ramp frame 70 can be rigidly engaged with an end of the labyrinthine girder 50 that terminates above the recessed section 26 of the chassis 10. In some embodiments, the first ramp support member 82, the intermediate cross member 80, or both can be rigidly engaged with the labyrinthine girder 50. The access ramp frame 70 can be coupled with the labyrinthine girder 50 via supports such as, for example, brackets, braces, ties, and the like. Alternatively, or additionally, the access ramp frame 70 can be in direct contact with the labyrinthine girder 50.

Figure 7:
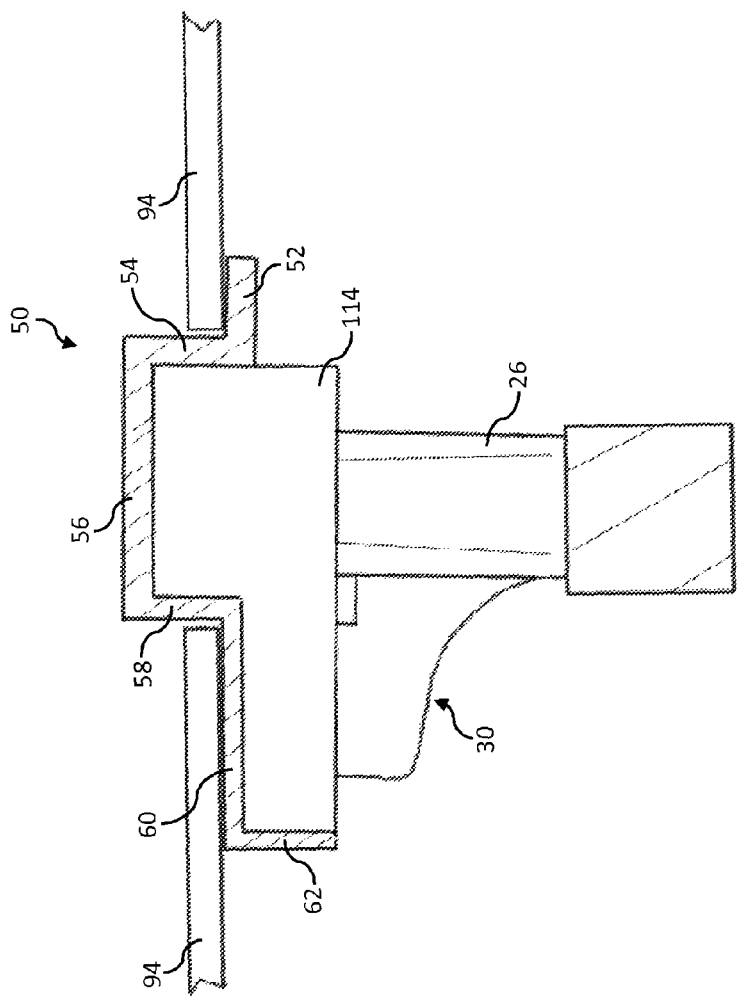
FIG. 7 depicts a detail view of the vehicle of FIG. 3 according to one or more embodiments shown and described herein.

Referring collectively to FIGS. 3 and 7, the labyrinthine girder 50 can be capped at the end above the recessed section 26 of the chassis 10 to provide additional strength to the rigid engagement of the access ramp frame 70 and the labyrinthine girder 50. Specifically, the labyrinthine girder 50 can be rigidly engaged with a ramp support plate 114 that fills at least a portion of the partial enclosure 64 of the labyrinthine girder 50. The ramp support plate 114 can be formed from material similar to the labyrinthine girder 50 to provide an additional mounting surface for the access ramp frame 70. In some embodiments, the ramp support plate 114 can follow the contour of the support bounding riser 62, the coupling platform 60, the second frame bounding riser 58, the frame bounding platform 56, and the first frame bounding riser 54 and extend downwards from the labyrinthine girder 50 towards the recessed section 26 of the chassis 10. It is noted that the ramp support plate 114 can be formed in any shape suitable to fill at least a portion of the partial enclosure 64 while providing additional strength to the rigid engagement between the labyrinthine girder 50 and the access ramp frame 70.

Referring collectively to FIGS. 1 and 6, the landing section 108 of the subfloor structure 102 can comprise a third labyrinthine girder 350 that extends from the second labyrinthine girder 250 towards the front axle 12 of the chassis 10. The third labyrinthine girder 350 can be of substantially similar construction as the labyrinthine girder 50, described hereinabove. One or more joists 94 can extend from the raised end 74 of the access ramp frame 70 to third labyrinthine girder 350. For example, a first end of the one or more joists 94 can be rigidly engaged with the upper cross member 78 of the access ramp frame and a second end of the one or more joists 94 can be rigidly engaged with the support platform 52 of the third labyrinthine girder 350. Additionally, spacers 96 can be rigidly engaged with the support platform 52, the coupling platform 60 of third labyrinthine girder 350, or both. One or more joists 94 can extend from the third labyrinthine girder 350 to the loading side support 90. For example, a first end of the one or more joists 94 can be rigidly engaged with the coupling platform 60 of third labyrinthine girder 350 and a second end of the one or more joists 94 can be rigidly engaged with the landing side support 92. Additionally, structural plates 98 can be rigidly engaged with the landing side support 92.

The landing section 108 of the subfloor structure 102 can further comprise a transition member 112 that extends from the raised end 74 of the access ramp frame 70 to the third labyrinthine girder 350. Accordingly, the transition member 112 can span any changes in elevation between the raised end 74 of the access ramp frame 70 and the third labyrinthine girder 350 to provide mounting surfaces and structural rigidity. In some embodiments, a first side of the transition member 112 can be rigidly engaged with the upper cross member 78 of the access ramp frame 70 and a second side of the transition member 112 can be rigidly engaged with the support platform 52 of the third labyrinthine girder 350. Accordingly, when the first side of the transition member 112 or the upper cross member 78 of the access ramp frame 70 is not substantially flush with the one or more joists 94 of the landing section 108 of the subfloor structure 102, the transition member 112 can gradually accommodate the elevation change such that the second side of the transition member 112 is substantially flush with the one or more joists 94 of the landing section 108 of the subfloor structure 102.

In addition to being rigidly engaged with both the access ramp frame 70 and the third labyrinthine girder 350, the transition member 112 can be rigidly engaged with the chassis 10 such as, for example, the portion of the chassis 10 immediately forward of the transition member 112. The transition member 112, as noted above, can be utilized as a structural component. Accordingly, the transition member 112 can be formed from a metal such as, for example, aluminum, steel, and the like. In some embodiments, the transition member 112 can be a desired length of angle iron. A top surface of each of the joists 94, spacers 96, structural plates 98, and transition member 112 of the landing section 108 can be substantially flush to provide mounting points for flooring sheets.

Referring again to FIGS. 1 and 2, the subfloor structure 102 can comprise an elevated passenger section 110 that is elevated with respect to the passenger section 106 to provide clearance for the rear axle 14 of the chassis 10. For example, the frame rail 22 of the chassis 10 can be formed with a raised section 27 adjacent to the rear axle 14. Accordingly, the elevated passenger section 110 can be formed from structural members that are configured to provide clearance between the subfloor structure 102 and the rear axle 14 during normal operation of the rear axle 14. In some embodiments, the boundary between the passenger section 106 and the elevated passenger section 110 can be delineated by a subfloor discontinuity 116, i.e., a more rapid change in elevation can occur at the subfloor discontinuity 116 that at the passenger section 106 or the elevated passenger section 110. Accordingly, a majority of the elevation change between the passenger section 106 and the elevated passenger section 110 can be consumed at the subfloor discontinuity 116, which can provide for a substantially flat passenger section 106 and landing section 108. The subfloor discontinuity 116 can be utilized as a step in the vehicle 100. Alternatively or additionally, a ramp can be utilized to provide access to the elevated passenger section 110 via the subfloor discontinuity 116.

Figure 8A:
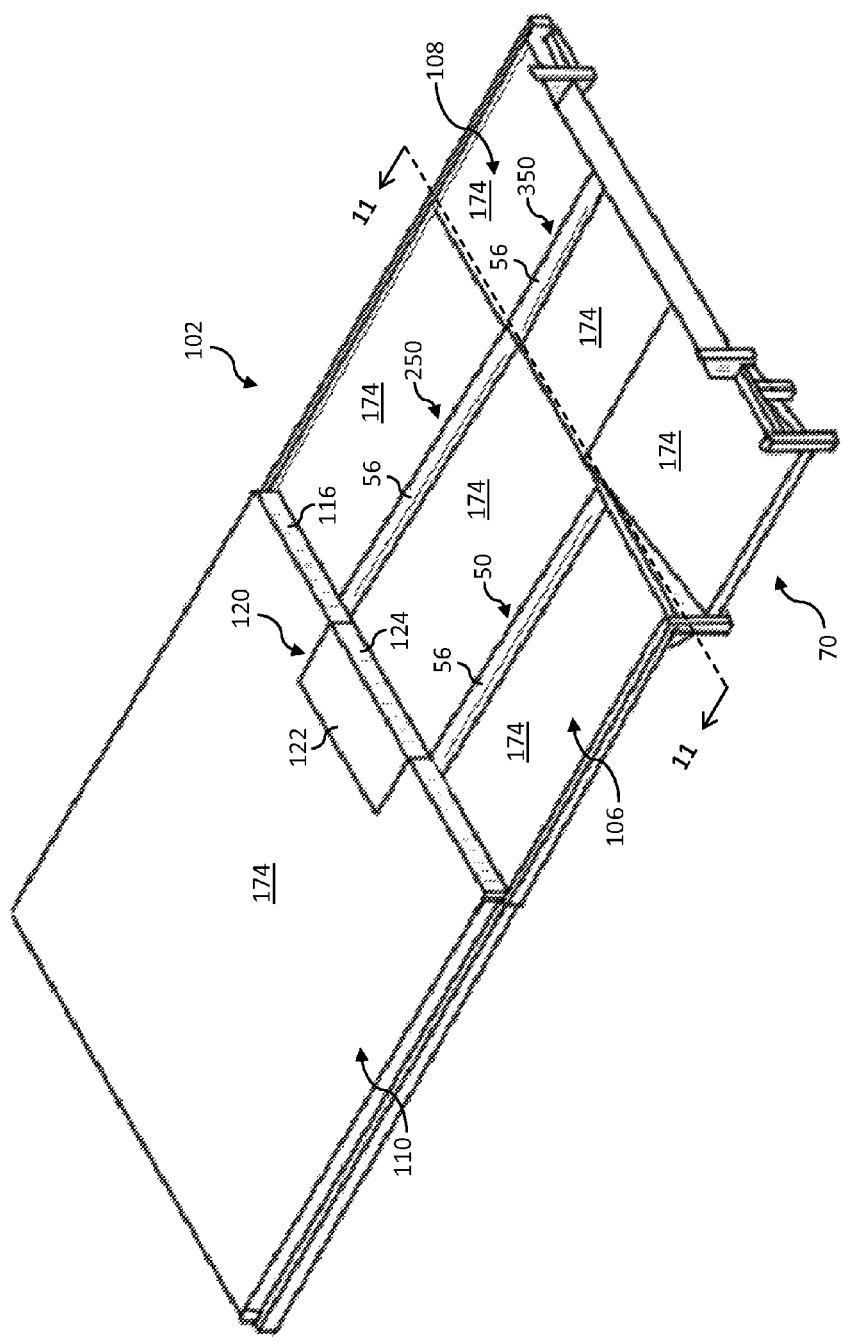
FIGS. 8A and 8B depict a subfloor structure according to one or more embodiments shown and described herein.
Figure 8B:
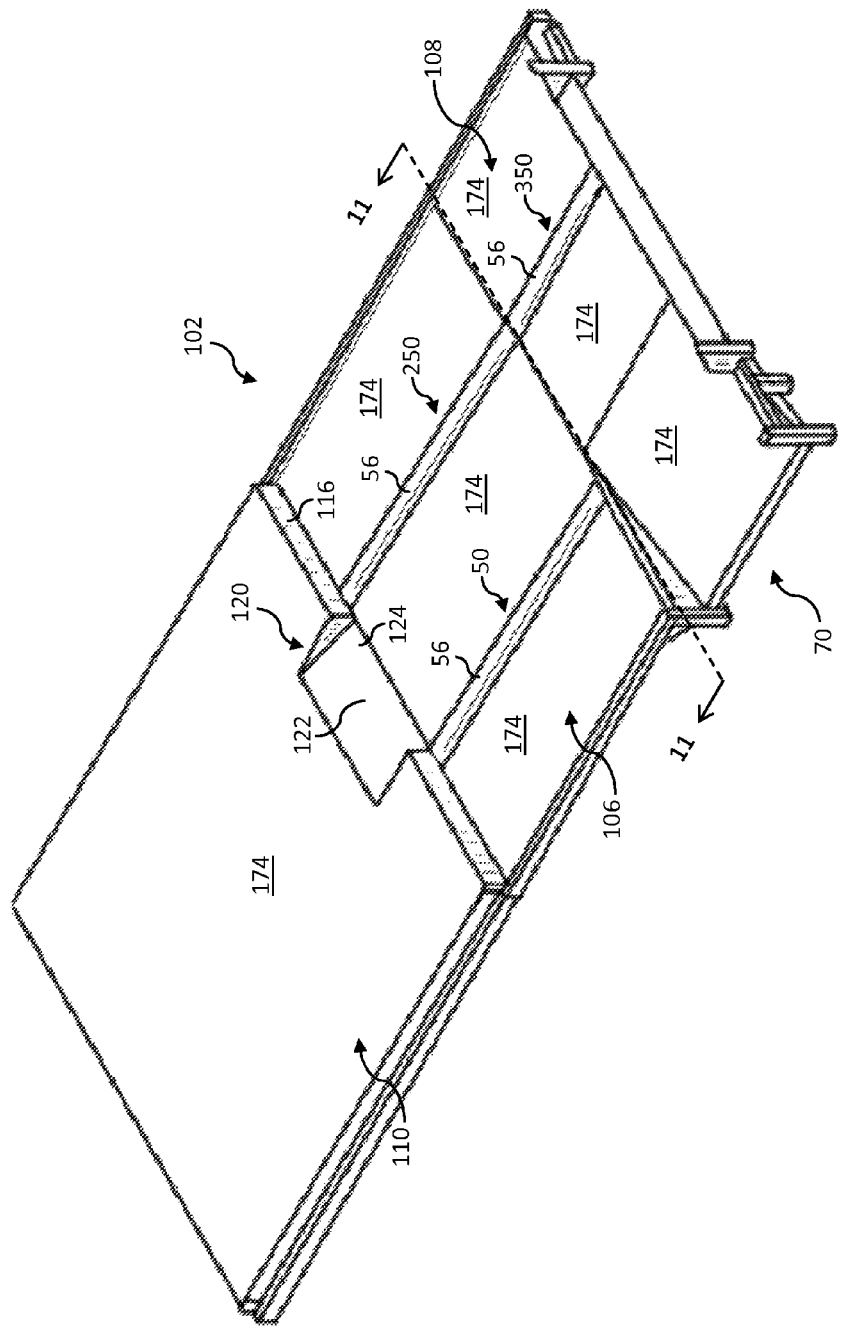

Referring now to FIGS. 8A and 8B, the embodiments described herein can comprise a retractable step 120 that can articulate automatically between a step position (FIG. 8A) and a ramp position (FIG. 8B). The retractable step 120 can comprise an articulating tread 122 that can be utilized both as a tread of a step when the retractable step 120 is in the step position and a ramp when the retractable step 120 is in the ramp position. The retractable step 120 can further comprise a riser door 124 that articulates and interacts with the retractable step 120 to transition between the step position and the ramp position.

Figure 9:
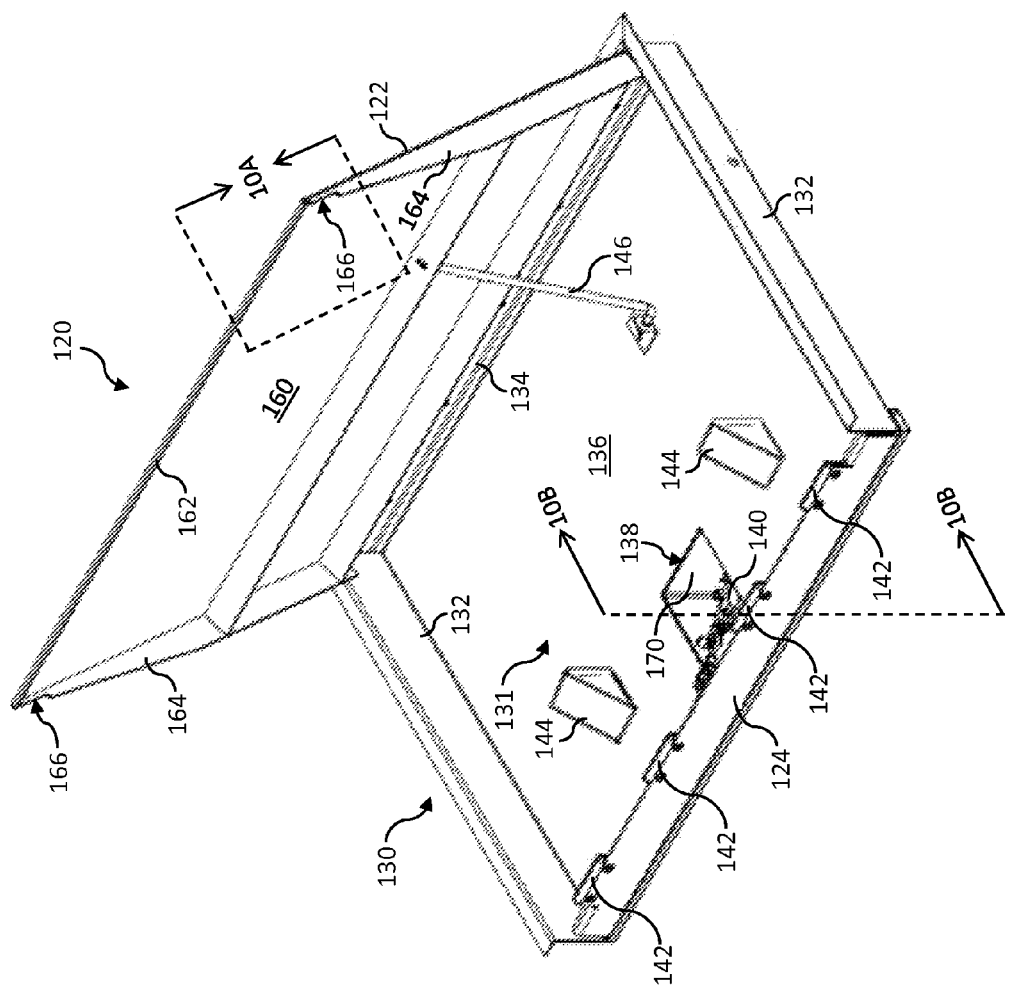
FIG. 9 depicts a retractable step according to one or more embodiments shown and described herein.

Referring now to FIG. 9, which depicts the retractable step 120 in a maintenance position, the retractable step 120 can comprise a ramp housing 130 that can be mounted to structural members and provide a support structure for the retractable step 120. In some embodiments, the ramp housing 130 can be formed in a substantially box shaped enclosure having sidewalls 132 and a back wall 134 that are rigidly engaged or integral with a base 136. The riser door 124 can be in rotatable engagement with the ramp housing 130 such that riser door 124 can rotate into and out of the interior 131 of the ramp housing 130. For the purpose of defining and describing the present disclosure, the phrase "rotatable engagement," as used herein, means that an object is directly or indirectly attached to another object in a manner that allows the object to swing around an axis. Accordingly, a rotatable engagement can include one or more hinges, pins, ball-socket joints, and the like.

The articulating tread 122 can be in rotatable engagement with the ramp housing 130 such that the articulating tread 122 can rotate into and out of the interior 131 of the ramp housing 130. In some embodiments, the articulating tread 122 can be in rotatable engagement with the back wall 134 of the ramp housing 130. As is noted hereinabove, the articulating tread 122 and the riser door 124 can cooperate to transition between the step position (FIG. 8A) and the ramp position (FIG. 8B). Accordingly, the articulating tread 122 and the riser door 124 can include components and features to facilitate cooperative motion. In some embodiments, the riser door 124 can be rigidly engaged with a light that is configured to illuminate at least a portion of the passenger section 106. The light can be any device capable of projecting optical signals such as, for example, an incandescent, a light emitting diode, a laser, and the like.

Figure 10A:
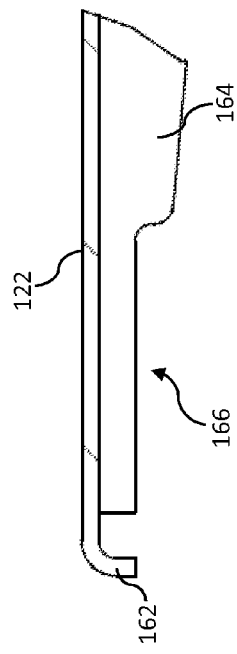
FIG. 10A depicts a detailed view of the retractable step of FIG. 9 according to one or more embodiments shown and described herein.

Referring collectively to FIGS. 9 and 10A, the articulating tread 122 can comprise a slide interface 160 for facilitating cooperative motion with the riser door 124. The slide interface 160 can be a substantially smooth surface located on the underside of the articulating tread 122. Additionally, the articulating tread 122 can comprise a block engagement feature 162 for temporarily retaining the riser door 124, when the retractable step 120 is in the step position (FIG. 8A). Accordingly, the block engagement feature 162 can be formed into any shape suitable to clasp or engage a portion of the riser door 124. For example, the block engagement feature 162 can be formed into a rounded corner, substantially semi-circular shape, or any other shape suitable to clasp a portion of the riser door 124. In some embodiments, the block engagement feature 162 can be formed at the free end of the articulating tread 122.

The retractable step 120 can comprise one or more angled support walls 164 for providing structural support to the articulating tread 122, when the retractable step 120 is in the ramp position (FIG. 8B). The one or more angled support walls 164 can be rigidly engaged with or integral to the articulating tread 122. In some embodiments, the retractable step 120 can comprise an angled support wall 164 on opposing sides of the articulating tread 122 adjacent to the sidewalls 132 of the ramp housing 130. The angled support walls 164 can be angled such that, when the retractable step 120 is in the ramp position (FIG. 8B), at least a portion of the one or more angled support walls 164 is in contact with the base 136 of the ramp housing 130. Accordingly, the one or more angled support walls 164 can bear loads applied to the articulating tread 122 and transfer at least a portion of the load to the base 136 of the ramp housing 130.

Each of the one or more angled support walls 164 can comprise a riser clearance feature 166 that cooperates with the riser door 124 to allow the angled support wall 164 to contact the base 136 of the ramp housing 130, when the retractable step 120 is in the ramp position (FIG. 8B). In some embodiments, the riser clearance feature 166 can be a profiled edge that matches the cross sectional shape of the riser door 124. Accordingly, when the retractable step 120 is in the ramp position (FIG. 8B), the riser clearance feature 166 can contact the angled support wall 164, while a portion of the angled support wall 164 is in contact with the base 136 of the ramp housing 130. In further embodiments, the riser clearance feature 166 can be a profiled edge that is oversized compared to the cross sectional shape of the riser door 124. Thus, when the retractable step 120 is in the ramp position (FIG. 8B), the riser clearance feature 166 can be offset from the angled support wall 164, while a portion of the angled support wall 164 is in contact with the base 136 of the ramp housing 130.

Referring again to FIG. 9, the riser door 124 can comprise one or more slide blocks 142 that cooperate with the articulating tread 122 to allow the retractable step 120 to transition between the step position (FIG. 8A) and the ramp position (FIG. 8B). For example, the one or more slide blocks 142 can slide across the slide interface 160 of the articulating tread 122 as the retractable step 120 transitions between the step position (FIG. 8A) and the ramp position (FIG. 8B). Accordingly, the one or more slide blocks 142 can be formed from any material that is resistant to fatigue and has a relatively low coefficient of friction such as, for example, polypropylene. Moreover, it is noted that alternative materials can be utilized and may include lubricants, rolling mechanisms, and the like.

Additionally, the one or more slide blocks 142 can support the articulating tread 122, when the retractable step 120 is in the step position (FIG. 8A). Specifically, the one or more slide blocks 142 can be shaped to apply a force within the block engagement feature 162 of the articulating tread 122, when the retractable step 120 is in the step position (FIG. 8A). Accordingly, the one or more slide blocks 142 can be formed to substantially match the profile of the block engagement feature 162.

The retractable step 120 can comprise an actuator 140 for driving the motion of the retractable step 120, holding the retractable step 120 in a fixed position, or both. The actuator 140 can be any mechanical system, electrical system, pneumatic system, hydraulic system or combination thereof capable of driving the retractable step 120. In some embodiments, it may be preferred to utilize a pneumatic actuator or electrical motor as the actuator 140 in order to provide greater reliability and cleanliness during operation. The actuator 140 can provide linear or rotational actuation to drive the rotation of the articulating tread 122.

Figure 10B:
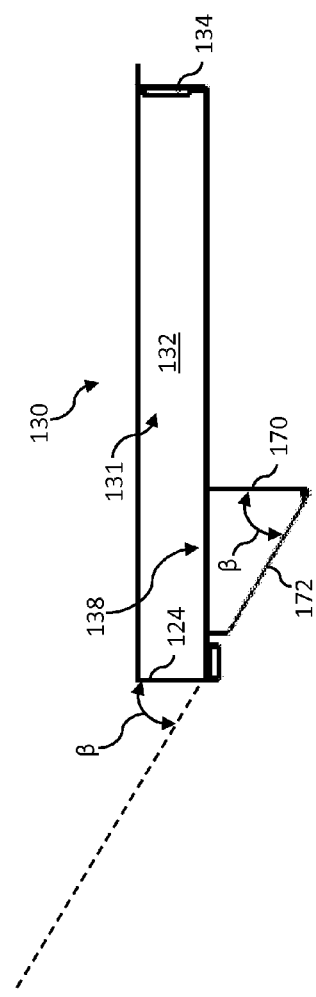
FIG. 10B depicts a cross sectional view of the retractable step of FIG. 9 according to one or more embodiments shown and described herein.

Referring collectively to FIGS. 9 and 10B, the actuator 140 can be in rotatable engagement with the riser door 124 and rigidly engaged with the ramp housing 130. In some embodiments, the ramp housing 130 of the retractable step 120 can comprise an actuator cavity 138 for aligning a linear actuation of the actuator 140 with the riser door 124. The actuator cavity 138 can extend downward from the base 136 of the ramp housing 130 and increase the volume of the interior 131 of the ramp housing 130. The actuator cavity 138 can comprise a back face 170 and an inclined face 172 that aligned with one another at an angle of incline β. In some embodiments, the angle of incline β can be acute. When the actuator 140 is a linear actuator, the linear actuation can be provided at an angle with respect to the riser door 124 that is less than or equal to the angle of incline β. Accordingly, the actuator 140 can be rigidly engaged within the actuator cavity 138 in substantial alignment with the back face 170. For example, the actuator 140 can be rigidly engaged with the back face 170, the inclined face 172, or both.

The ramp housing 130 of the retractable step 120 can further comprise one or more inclined towers 144 for providing additional clearance for chassis components such as, for example, suspension and axle components. The one or more inclined towers 144 can extend upward from the base 136 of the ramp housing 130 and decrease the volume of the interior 131 of the ramp housing 130. The one or more inclined towers 144 can be shaped to provide clearance for the articulating tread 122, when the retractable step 120 is in the ramp position (FIG. 8B). In some embodiments, the one or more inclined towers 144 can be shaped to contact and provide structural support for the articulating tread 122, when the retractable step 120 is in the ramp position (FIG. 8B). Additionally, the ramp housing 130 can comprise a prop bar 146 that is in rotatable engagement with the base 136 of the ramp housing 130 at a first end and configured to support the tread in the maintenance position (FIG. 8) at a second end.

Figure 11:
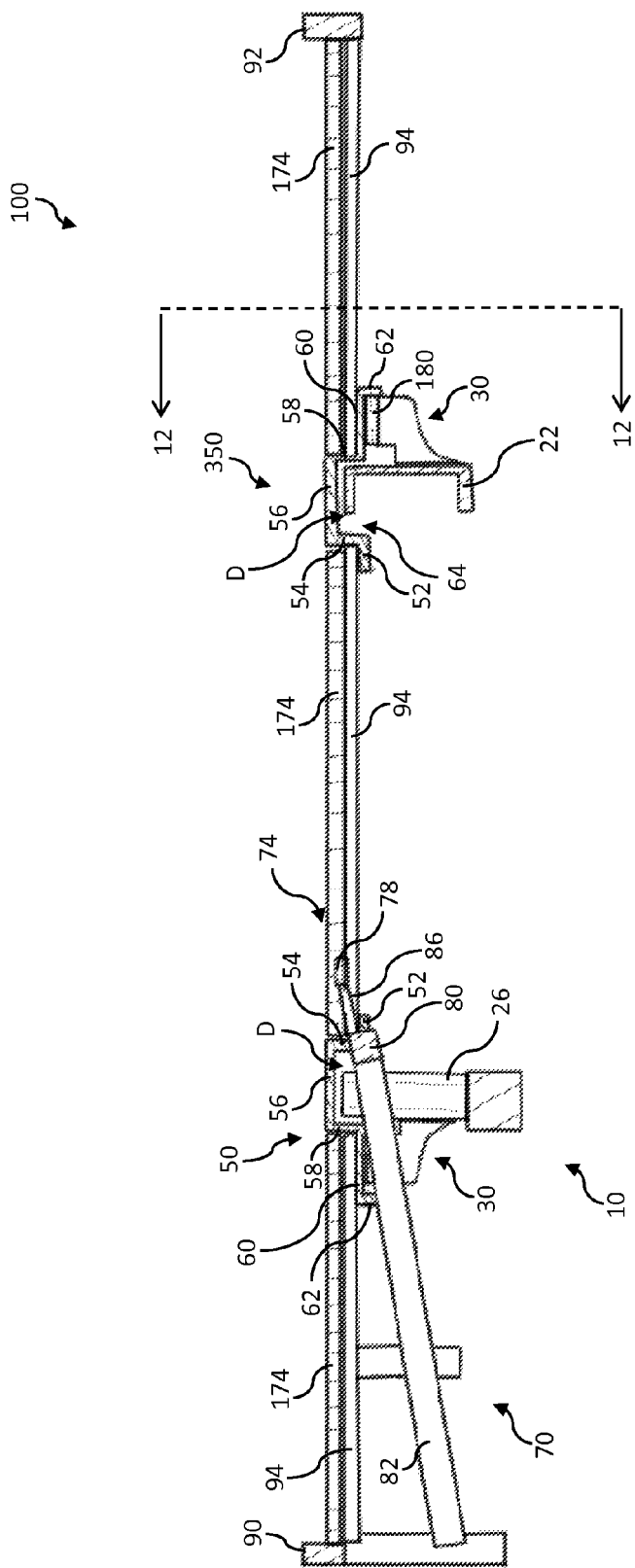
FIG. 11 depicts a cross sectional view of the subfloor structure of FIGS. 8A and 8B according to one or more embodiments shown and described herein.

Referring now to FIG. 11, the subfloor structure 102 an be rigidly engaged with the chassis 10 to provide support for interior components such as, for example, flooring sheets, carpeting, padding, seating, and the like. In some embodiments, the subfloor structure can be rigidly engaged with the chassis 10 such that an offset distance D is maintained between the frame rail 22 and the labyrinthine girder 50 and the frame rail 22 and the third labyrinthine girder 350. The offset distance D is any distance suitable to maintain a clearance between the frame rail 22 and the labyrinthine girder 50 and the frame rail 22 and the third labyrinthine girder 350 during normal operation of the vehicle 100.

Figure 12:
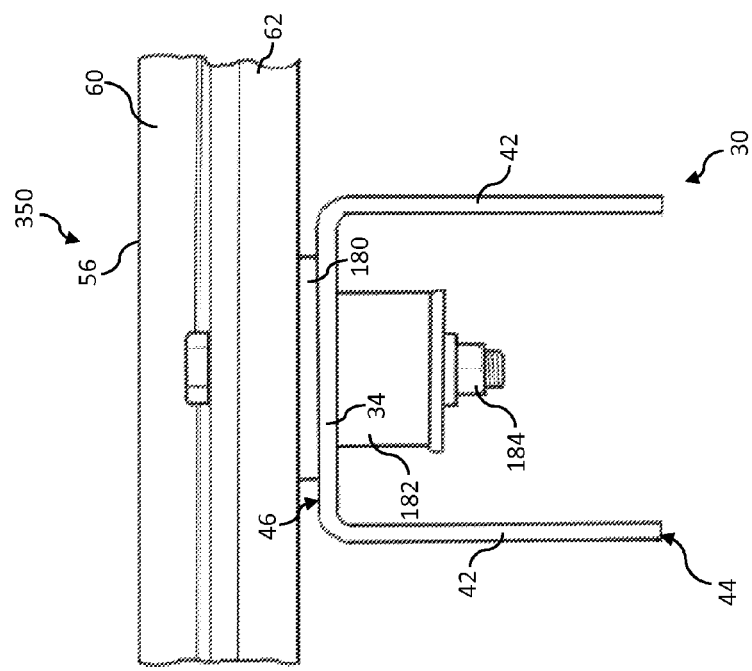
FIG. 12 depicts a detail view of the subfloor structure of FIG. 11 according to one or more embodiments shown and described herein.

Referring collectively to FIGS. 4A, 11 and 12, the subfloor structure 102 can comprise one or more support members 30 rigidly engaged with the frame rails 22 of the chassis 10. Specifically, the chassis end of the frame coupling member 32 of the support member 30 can be rigidly engaged with the frame rail 22. The support member 30 can project away from the frame rail 22 and the notch 38 can form a cavity adjacent to the frame rail 22. Accordingly, the girder support member 34 can be cantilevered from the frame rail 22 and provided as a mount for the third labyrinthine girder 350. It is noted that, while description is provided regarding mounting the third labyrinthine girder 350 to the one or more support members 30, the labyrinthine girder 50 and the second labyrinthine girder 250 can be mounted to the one or more support members 30 in a manner similar to the third labyrinthine girder 350.

Referring collectively to FIGS. 11 and 12, the subfloor structure 102 can further comprise a vibration isolator 180 for mitigating relative downward motion of the subfloor structure 102 with respect to the frame rail 22. The vibration isolator 180 can be formed from any material exhibiting viscoelastic properties including, but not limited to, polymers such as, for example, rubber, polyurethane, and the like. In some embodiments, the vibration isolator 180 can be formed in a substantially cylindrical shape having a through hole in the center. The vibration isolator 180 can be located between the girder support member 34 of the support member 30 and the coupling platform 60 of the third labyrinthine girder 350.

In some embodiments, the subfloor structure 102 can further comprise an additional vibration isolator 182 for mitigating relative upward motion of the subfloor structure 102 with respect to the frame rail 22. For example, the additional vibration isolator 182 can be located beneath the vibration isolator 180 with the girder support member 34 of the support member 30 located between the additional vibration isolator 182 and the vibration isolator 180. The coupling platform 60 of the third labyrinthine girder 350 can be fastened to the vibration isolator 180, the support member 30, and the additional vibration isolator 182 with a fastener 184. As used herein, the term "fastener" means a device for enclosing objects together to limit the motion of the objects with respect to one another such as, for example, a bolt, a crew, a pin, a rivet, a rod, and the like. The pitch of the second labyrinthine girder 250 from front to back can be adjusted by varying the height of the vibration isolator 180, by varying the elevation of the support members 30, or a combination thereof.

Referring collectively to FIGS. 8A, 8B and 11, the subfloor structure 102 can further comprise one or more subfloor sheets 174 for providing a substantially flat surface for the interior components (e.g., carpeting, padding, seating, etc.) of the vehicle 100. The subfloor sheets 174 can be a single layer of material or can be composed of multiple layers of one or more materials. In some embodiments, the subfloor sheets 174 can be flush with the frame bounding platform 56 of the labyrinthine girder 50, the second labyrinthine girder 250, the third labyrinthine girder 350, or combinations thereof. Specifically, the thickness of the subfloor sheet 174 can be set such that when the subfloor sheet 174 lays upon a component of the subfloor structure 102 such as, for example, a joist 94, a spacer 96 (FIG. 1), or a structural plate 98 (FIG. 1), the subfloor sheet 174 is flush with the frame bounding platform 56.

It should now be understood that the embodiments described herein can provide access to the interior of a vehicle for passengers that require the use of assistive devices such as, for example, walkers or wheelchairs. Specifically, the subfloor structures described herein can provide a plurality of sections that can form interior sections of substantially flat and substantially level surfaces for the ingress and egress of passengers using assistive devices.

Specifically, the vehicle can be provided with a suspension system that kneels the vehicle to curb height such that a ramp is provided for ingress of a passenger with the assistive device. The ramp can have a substantially smooth surface that gradually inclines to a landing section. The incline can be set such that passengers with limited mobility and dexterity can traverse the ramp to the loading section. According to the embodiments described herein, the landing section can be wide enough such that one passenger with an assistive device can remain stationary on the landing section away from the ramp, while a second passenger with a second assistive device can enter the landing section adjacent to the ramp. Moreover, the landing section can be wide enough such that the second passenger with the second assistive device is provided with a substantially flat surface that allows the second assistive device to be turned towards the passenger section without disturbing the passenger with the assistive device or contacting other interior components (e.g., hand rails, seats, elevated ridges, and the like). Accordingly, the landing section can be utilized as a location to collect fairs or for any other purpose that leads to grouping of passengers or assistive devices.

The passenger section can gradually incline, at a rate less than the entrance ramp, backwards towards a step to an elevated passenger section. The step can include a retractable step that articulates into a ramp or a step. Accordingly, during ingress or egress the ramp can be provided to allow access to the elevated passenger section for passengers with assistive devices. For example, the retractable ramp can be lowered contemporaneously with the kneeling of the vehicle. Thus, ingress or egress to all sections of the vehicle can be provided to handicapped passengers.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle for transporting passengers comprising:
a chassis comprising a front axle, a rear axle that is offset from the front axle by an axle distance and a frame that supports the front axle and the rear axle, wherein the frame comprises a frame rail having a recessed section and a standard section such that the frame rail spans at least a portion of the axle distance and the recessed section is lowered compared to the standard section;
a support member rigidly engaged to the frame rail, wherein the support member projects from the frame rail; and
a labyrinthine girder comprising a coupling platform that is coupled to the support member, wherein the labyrinthine girder forms a partial enclosure that surrounds a portion of the frame rail and an offset distance is disposed between the labyrinthine girder and the frame rail.

2. The vehicle of claim 1, further comprising an additional support member coupled to the labyrinthine girder, wherein the labyrinthine girder is offset from the frame rail at a first height at the support member and the labyrinthine girder is offset from the frame rail at a second height at the additional support member such that the first height and the second height are not equal and the labyrinthine girder is sloped.

3. The vehicle of claim 1, wherein the support member comprises a frame coupling member that is rigidly engaged with the frame rail, and a girder support member that is coupled to the labyrinthine girder, and wherein the girder support member is offset from the frame coupling member.

4. The vehicle of claim 3, wherein the support member comprises a notch formed between the frame coupling member and the girder support member.

5. The vehicle of claim 3, wherein the support member comprises a mounting orifice formed through the girder support member to accept a fastener, and wherein the mounting orifice has an aspect ratio greater than about 1.

6. The vehicle of claim 3, wherein the frame coupling member has a chassis end that is rigidly engaged with the frame rail and a free end having an arched portion, and wherein the arched portion is formed underneath the girder support member and gradually extends away from the chassis end of the frame coupling member.

7. The vehicle of claim 1, further comprising a vibration isolator located between the labyrinthine girder and the support member such that the labyrinthine girder and the support member are separated by a height along the vibration isolator.

8. The vehicle of claim 7, wherein the vibration isolator is substantially cylindrically shaped with a through hole, and wherein the labyrinthine girder, the support member, and the vibration isolator are united with a fastener that passes through the through hole of the vibration isolator.

9. The vehicle of claim 7, wherein the vibration isolator is formed from a polymer.

10. The vehicle of claim 1, wherein the labyrinthine girder comprises a cross section having a substantially top hat shape.

11. The vehicle of claim 10, wherein the labyrinthine girder comprises a support platform, a first frame bounding riser, a frame bounding platform, and a second frame bounding riser, and wherein the support platform extends to the first frame bounding riser to define a first girder angle, the first frame bounding riser extends to the frame bounding platform to define a second girder angle, the frame bounding platform extends to the second frame bounding riser to define a third girder angle, and the second frame bounding riser extends to the coupling platform to define a fourth girder angle, and wherein each of the first girder angle, the second girder angle, the third girder angle, and the fourth girder angle is from about 45° to about 135°.

12. The vehicle of claim 11, wherein the labyrinthine girder comprises a support bounding riser that extends from the coupling platform to bound the support member.

13. The vehicle of claim 1, wherein the labyrinthine girder comprises a first frame bounding riser and a second frame bounding riser that extend substantially vertically and a frame bounding platform that spans between the first frame bounding riser and the second frame bounding riser such that the first frame bounding riser, the second frame bounding riser and the frame bounding platform cooperate to define the partial enclosure, and wherein the second frame bounding riser extends from the coupling platform.

14. The vehicle of claim 13, further comprising a joist rigidly engaged with the labyrinthine girder and a subfloor sheet rigidly engaged with the joist, wherein the subfloor sheet is substantially flush with the frame bounding platform of the labyrinthine girder.

15. The vehicle of claim 1, further comprising an access ramp frame rigidly engaged with the labyrinthine girder, the access ramp frame having a lowered end and a raised end, wherein the access ramp frame gradually increases in elevation from the lowered end to the raised end.

16. The vehicle of claim 15, wherein the labyrinthine girder has an end that terminates above the recessed section of the frame rail, and the access ramp frame is rigidly engaged with the end of the labyrinthine girder.

17. The vehicle of claim 16, wherein the labyrinthine girder is in direct contact with the access ramp frame.

18. The vehicle of claim 16, wherein the end of the labyrinthine girder is rigidly engaged with a ramp support plate that fills at least a portion of the partial enclosure, and wherein the access ramp frame is rigidly engaged with the ramp support plate.

19. The vehicle of claim 15, further comprising an additional labyrinthine girder that is offset from the labyrinthine girder and a transition member having a first side that is rigidly engaged with the raised end of the access ramp frame and a second side that is rigidly engaged with the additional labyrinthine girder, wherein the transition member gradually increases in elevation from the first side to the second side.

20. The vehicle of claim 1, further comprising an additional labyrinthine girder that is aligned with the labyrinthine girder, wherein the labyrinthine girder and the additional labyrinthine girder are substantially parallel.

* * * * *